E. M. CRANDAL.
Pencil-Sharpeners.
No. 136,590.            Patented March 11, 1873.
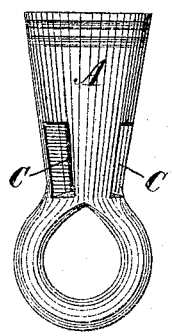
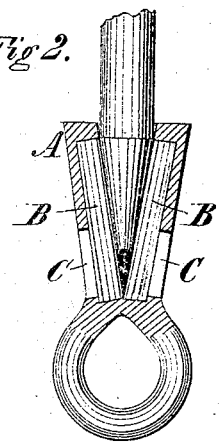
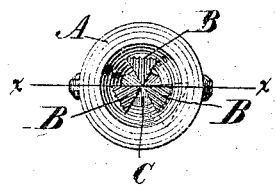
Witnesses.
Harry King.
W. H. Dodge.
Inventor:
Edward M. Crandall
by Dodge & Son
Attys.

UNITED STATES PATENT OFFICE.

EDWARD M. CRANDAL, OF CHICAGO, ILLINOIS.

IMPROVEMENT IN PENCIL-SHARPENERS.

Specification forming part of Letters Patent No. 136,590, dated March 11, 1873.

*To all whom it may concern:*

Be it known that I, EDWARD M. CRANDAL, of Chicago, in the county of Cook and State of Illinois, have invented certain Improvements in Slate-Pencil Sharpeners, of which the following is a specification:

My invention relates to an improved device for sharpening or pointing slate-pencils; and consists in a conical socket provided with a series of internal file-blades, as hereinafter fully described.

Figure 1 is a side view of my sharpener; Fig. 2, a longitudinal central section of the same in use; and Fig. 3, an end view, looking into the mouth.

In constructing my device I provide a conical metal socket, A, and secure therein three file-blades, B, and then make three holes or openings, C, outward between the inner ends of the blades, to permit the escape of the portions removed from the pencil. The blades are made of decreasing width toward their inner ends, and have the teeth formed lengthwise upon them. They are secured in place by casting the body of the socket upon or around them, the blades being arranged in position against a central core in the mold, and then the metal to form the body poured in around them. The body is made of soft metal, which chills so quickly as not to affect the temper of the blades. The inner ends of the blades are arranged so as to come in contact with each other, so as to form a very fine point on the pencil.

The end of the pencil, being introduced into the socket and turned around therein, is acted upon simultaneously by all the teeth of the different file-blades, and is rapidly brought to a point thereby. The particles removed by the teeth escape through the openings C, so as to leave the teeth free and unobstructed, and permit them to act to the best advantage.

It is, of course, obvious that a greater or less number of the file-blades may be used, and that, instead of casting the body upon them, they may be inserted and fastened after it is otherwise completed.

I am aware that there have been numerous sharpeners patented having a conical socket with one or more single blades secured therein; but I believe myself to be the first to employ file-blades, and to bring the ends of the blades in contact with each other, so as to produce a very fine point on the pencil.

By my method of construction I am enabled to produce a sharpener which is cheaper, more durable, and quicker in its operation than those heretofore in use.

Having thus described my invention, what I claim is—

The herein-described device for sharpening slate-pencils, consisting of the conical body A having the file-blades B and the openings C, constructed and arranged to operate as herein set forth.

EDWARD M. CRANDAL.

Witnesses:
CHAS. E. HOVEY,
P. T. DODGE.